(No Model.)
2 Sheets—Sheet 1.
A. B. HAYDEN.
COMPUTING SCALE.
No. 506,112. Patented Oct. 3, 1893.
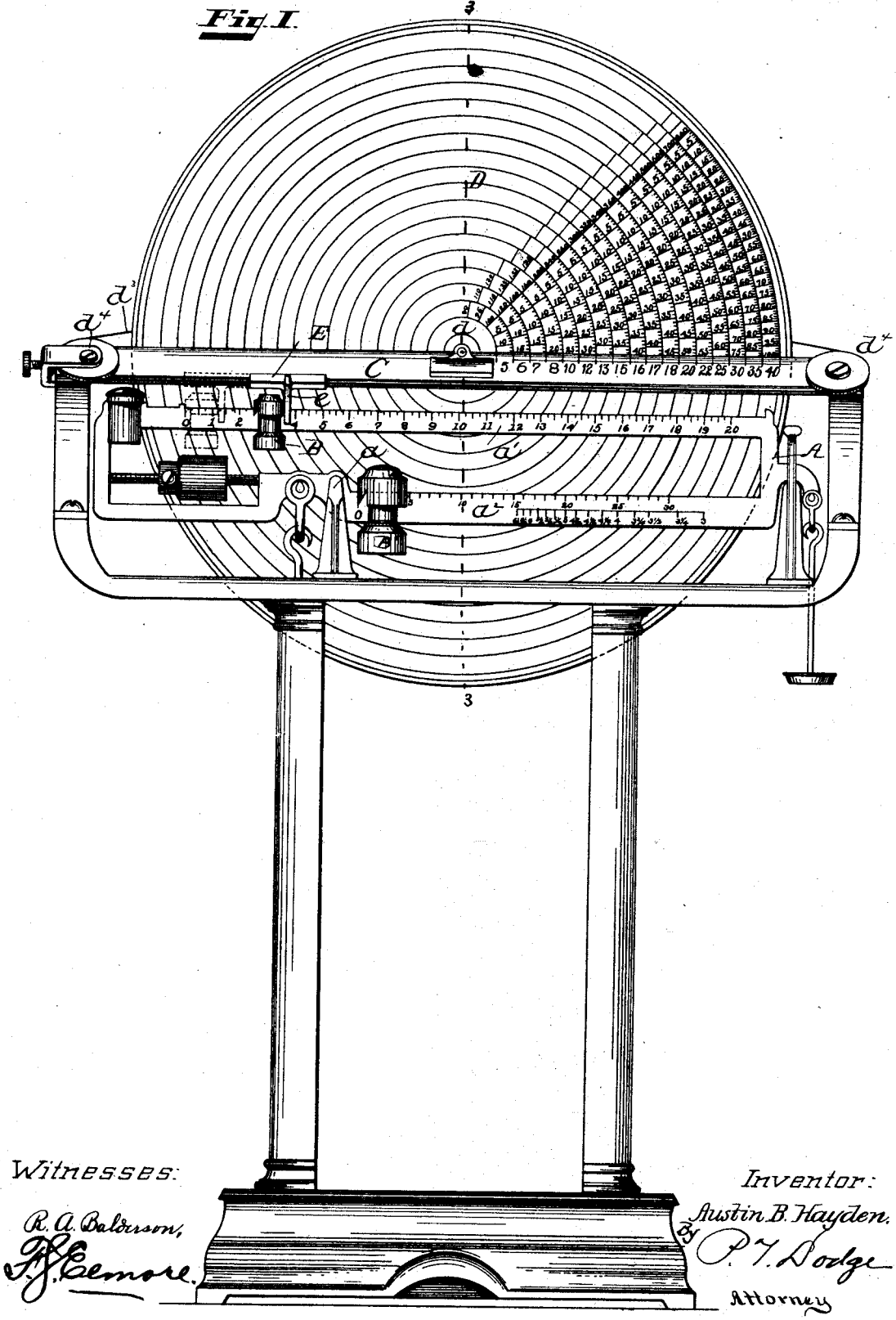
Fig. I.
Witnesses:
R. A. Balderson,
T. J. Elmore.
Inventor:
Austin B. Hayden,
By P. T. Dodge
Attorney (No Model.) 2 Sheets—Sheet 2.
A. B. HAYDEN.
COMPUTING SCALE.
No. 506,112. Patented Oct. 3, 1893.
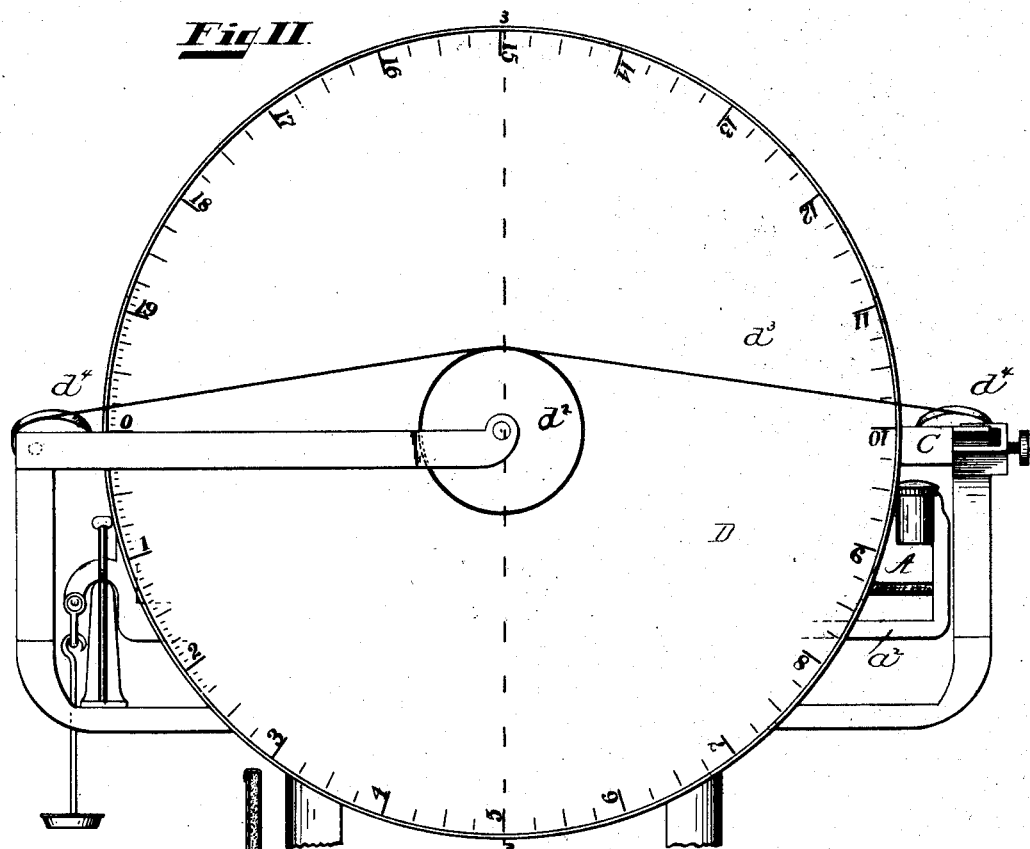
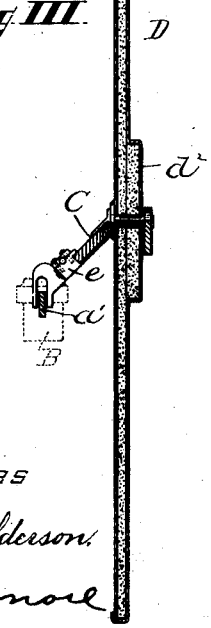
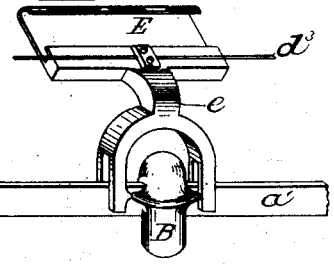
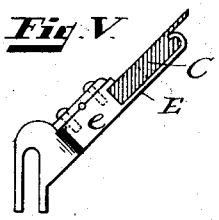
Witnesses
R. A. Balderson.
L. J. Elmore
Inventor:
Austin B. Hayden
By P. T. Dodge
His Attorney

UNITED STATES PATENT OFFICE.

AUSTIN B. HAYDEN, OF KANSAS CITY, MISSOURI.

COMPUTING-SCALE.

SPECIFICATION forming part of Letters Patent No. 506,112, dated October 3, 1893.

Application filed March 25, 1893. Serial No. 467,549. (No model.)

*To all whom it may concern:*

Be it known that I, AUSTIN B. HAYDEN, of Kansas City, county of Jackson, and State of Missouri, have invented a new and useful Improvement in Computing-Scales, of which the following is a specification.

The aim of my invention is to provide a beam scale with an automatically operated dial so graduated that it will indicate the value of each load in dollars and cents, at different prices. To this end it consists in the combination with the scale of a dial, having a series of concentric circles, each graduated to represent different values, and intermediate connections through which this dial receives motion from a weight on the scale beam, or from a manual device, movable along the scale beam.

Figure 1, is a front elevation of a scale, provided with my indicator in its preferred form. Fig. 2, is a rear elevation of the indicator mechanism. Fig. 3, is a vertical cross section on the line 3—3 of Figs. 1 and 2. Fig. 4, is a perspective view of the automatic dial indicating apparatus. Fig. 5, is a cross section on the line 5—5 of the preceding figure.

Referring to Figs. 1, 2 and 3, A represents an ordinary double beam of a beam scale, having its fulcrum at $a$, and having its upper and lower arms $a'$, $a^2$, graduated longitudinally and provided with sliding weights B, B', as usual. This beam, the scale, and all the other weighing mechanism, may be of any ordinary or approved construction.

As illustrated in the drawings the apparatus is adapted to compute the cost of articles or commodities at from five to forty cents per pound up to twenty pounds in weight, and it is to be understood that while a double-beam scale is shown the computing disk is laid out with reference to the upper beam alone.

In the following description the lower beam is not taken into account.

In applying my improvement I attach to the top of the scale frame or standard, a bar or other rigid support C, having a suitable box or bearing at the middle to sustain the shaft of the large dial plate D, which is free to rotate and which is provided on its face with a series of concentric circles, each subdivided into suitable spaces representing dollars and cents, these spaces bearing numbers consecutively arranged from a radial starting line $d$. The numbers in these circular graduations represent the value in money of the articles being weighed. The disk lies adjacent to the supporting bar C, which latter is provided as shown with a series of graduations corresponding in width to the respective circles on the dial. These graduations bear figures representing different prices per pound of the articles to be weighed. Each circle on the dial is graduated with due reference to the corresponding numeral on the bar C. For example, a circle which registers with 8 on the bar C represents the value of different weights at .08 per pound. On the back of the dial there is a central pulley $d^2$, from which an operating cord $d^3$ wound thereon, is extended in opposite directions around guide pulleys $d^4$, the two ends of the cord being attached to a slide E, arranged to move to and fro on the bar C and having a depending arm $e$, which straddles the scale beam, in position to be encountered by the weight B. When, therefore, this weight is moved along the beam in the course of the weighing operation, it advances the slide E, and causes the dial to be turned. If, for instance, the weight is advanced to indicate seven pounds on the beam, the dial will be turned so as to bring the values of seven pounds in register with the upper edge of the bar C, so that by glancing along the bar until the number thereon corresponding to the value per pound is found, and then reading the adjacent number on the dial, the money value of the article weighed will be shown. It will be seen that under this construction there is an automatic mechanical computation of the value, avoiding labor to the vender, and preventing imposition upon the vendee.

It is not necessary that the dial shall be automatically operated by the weight. If preferred the slide E may be moved along the beam until it stands opposite that number which indicates the weight of the load. Thus, while the lower beam $a^2$ has not been taken into account in the foregoing description, it will be understood that when this beam is used the slide E may be moved forward independently of the weight on the upper beam to the point at which it would stand if the upper beam and weight were used, supposing of course the indicated weight to be within the limits of the scale of the upper beam. When the weight exceeds the limits of the scale the price may still be computed by dividing the indicated weight into aliquot parts, ascertaining the cost or value of the parts separately, and then adding the indicated amounts together. The sum will be the aggregate cost of the several parts.

The arm or pointer of the slide may be modified in form, at will, so as to be operated by the weight, or independently put along, providing only it moves adjacent to the beam.

The details of the graduations of the dial may be varied at will and the connections between the dial and the device moving along or adjacent to the beam, may also be varied, as the skilled mechanic will readily perceive that there are many known mechanical devices by which motion may be imparted from the slide to the dial.

In Fig. 4 I have represented the slide E as having a forked lower arm to straddle the weight, whereby the weight is caused to move the dial in both directions, rendering the operation wholly automatic.

What I claim as my invention is—

1. In combination with a scale beam graduated for weight, and cost indicating dial, a price-scale adjacent to, and substantially parallel with, the scale-beam, and a dial operating device movable along the beam adjacent to these graduations.

2. The combination with the scale-beam, of a fixed or immovable price-scale, a rotary graduated cost-indicating dial journaled adjacent to the price-scale, in bearings on the scale frame a movable pointer adjacent to the scale-beam, and a connection between the pointer and dial to rotate the latter when the pointer is moved.

3. In combination with a scale beam, the dial having circular series of graduations indicating cost, the price indicating scale the slide movable along the scale beam, and the operating cord extended from said slide around suitable guides to the dial.

4. In combination with the scale beam, its sliding weight, the slide E, the dial provided with circular series of graduations indicating price, and with the pulley and the cord extended from the slide around suitable guides to said dial pulley.

5. In combination with a scale beam, the dial having the circular series of graduations, the bar C having the corresponding graduations to indicate price, the slide movable along the beam, and connections from said slide to the dial.

In testimony whereof I hereunto set my hand this 1st day of March, 1893, in the presence of two attesting witnesses.

AUSTIN B. HAYDEN.

Witnesses:
  FREDK. J. WARBURTON,
  THOS. KILVERT.